(12) United States Patent
Xie

(10) Patent No.: US 6,231,180 B1
(45) Date of Patent: May 15, 2001

(54) DETACHABLE SHELTER FRAME FOR SPECTACLES

(76) Inventor: Yiling Xie, 10699 Hickson St. #4, El Monte, CA (US) 91731

( * ) Notice: Subject to any disclaimer, the term of this patent is extended or adjusted under 35 U.S.C. 154(b) by 0 days.

(21) Appl. No.: 09/627,729

(22) Filed: Jul. 28, 2000

(51) Int. Cl.[7] ..................................................... G02C 9/00
(52) U.S. Cl. ............................................... 351/47; 351/57
(58) Field of Search ................................ 351/47, 48, 57, 351/58, 44, 41

(56) References Cited

U.S. PATENT DOCUMENTS 6,164,774 * 12/2000 Cate ........................................ 351/47

* cited by examiner

Primary Examiner—Hung Xuan Dang
(74) Attorney, Agent, or Firm—Raymond Y. Chan; David and Raymond Patent Group (57) ABSTRACT

A detachable shelter frame is adapted for mounting on a primary spectacle frame by means of at least two resilient mounting devices. Each of the resilient mounting devices comprises a resilient arm extending rearwardly from the respective auxiliary lens of the shelter frame to ride on the primary spectacle frame, and an engaging member which is connected to the resilient arm and extended to press against a rear side of the primary spectacle frame, wherein the two resilient arms substantially pull the two engaging members towards the primary spectacle frame so as to apply an urging pressure against the primary spectacle frame for holding the frame body of the primary spectacle frame between the shelter frame and the engaging members, so as to securely mounting the shelter frame in front of the primary spectacle frame.

32 Claims, 10 Drawing Sheets

DETACHABLE SHELTER FRAME FOR SPECTACLES

BACKGROUND OF THE PRESENT INVENTION

1. Field of Invention

The present invention relates spectacle frame, and more particularly to a detachable shelter frame with auxiliary lenses such as sunglasses, which is adapted for mounting on a primary spectacle frame by means of a resilient engaging arrangement.

2. Description of Related Arts

Shelter frames are widely used today. A conventional shelter frame such as clip-on sunglasses comprises a plurality of clipping claws for detachably mounting on shortsighted or farsighted eyeglasses so that the wearer does not need to carry and pay for another pair of shortsighted or farsighted sunglasses. However, the metal made clipping claws may scratch the lenses of the primary eyeglasses during the mounting process. Also, the wearer requires both hands to align and engage the conventional clip-on sunglasses on the primary eyeglasses in correct position. It is troublesome and dangerous for a wearer to use his or her both hands to wear such clip-on sunglasses on the regular glasses while he or she is driving.

In order to solve the problems of the above mentioned clip-on sunglasses, magnetic attachment is recently introduced into the eyeglasses industry. A primary pair of magnet members is affixed on two upper side extensions of a primary spectacle frame respectively. An shelter frame such as a sunglasses includes a pair of arms for resting over the upper side extensions for preventing the shelter frame from moving downward relative to the primary spectacle frame and an auxiliary pair of magnet members connected to the arms respectively for engaging with the primary magnet members of the primary spectacle frame so as to stably attach the shelter frame to the primary spectacle frame. However, the users have to align two pairs of magnet members. If the auxiliary magnet members of the sunglasses are misaligned with the primary magnet members of the primary spectacle frame, the sunglass will fall down from the primary spectacle frame easily.

Thus, the major drawback of the eyeglasses equipped with the magnet attachment is that the primary spectacle frame needs to be altered its original structural design in order to affix the magnet members thereon. So, the wearer may have to buy a pair of spectacle frames including a primary eyeglasses and an auxiliary sunglasses, which is much expensive than that the wearer needs to buy the clip-on sunglasses only. Moreover, a pair of primary magnet members is always located in front of the user's eyes.

SUMMARY OF THE PRESENT INVENTION

A main object of the present invention is to provide a detachable shelter frame for spectacles, wherein the detachable shelter frame can be precisely and easily attached on a primary spectacle frame by means of a resilient mounting device so as to securely mount on the primary spectacle frame without the use of any magnet and the risk of scratching the lenses of the primary spectacle frame like the conventional clip-on sunglasses.

Another object of the present invention is to provide a detachable shelter frame for spectacles, wherein at least two resilient arms of the shelter frame are arranged to engage with the two side extensions or the lens frame of the primary spectacle frame, so as to prevent up and down movement or sideward movement of the shelter frame with respect to the primary spectacle frame.

Another object of the present invention is to provide a detachable shelter frame for spectacles, wherein the wearer may merely use one hand to attach or detach the shelter frame during exercising or driving.

Another object of the present invention is to provide a detachable shelter frame for spectacles that is adapted to be mount installed to all kinds of the primary spectacle frame because no specific modification is required for the primary spectacle frame to adapted the shelter frame.

Another object of the present invention is to provide a detachable shelter frame for spectacles, which does not require to change the original structural design of the primary spectacle frame, so as to minimize the purchasing cost for the users.

Accordingly, in order to accomplish the above objects, the present invention provides a detachable shelter frame adapted for mounting in front of a primary spectacle frame which comprises a frame body for mounting a pair of lenses in position. The frame body comprises a bridge connected between the two lenses and two side extensions provided at two outer sides of the lenses respectively each having a hinge portion extended rearwardly therefrom for pivotally coupling a temple.

The shelter frame for supporting two auxiliary lenses comprises a bridge extended between the two auxiliary lenses and a pair of resilient mounting devices connected thereto for mounting the shelter frame on the primary spectacle frame.

Each of the resilient mounting devices comprises a resilient arm extending rearwardly from the respective auxiliary lens of the shelter frame to ride on the primary spectacle frame, and an engaging member which is connected to the resilient arm and extended to press against a rear side of the primary spectacle frame, wherein the two resilient arms substantially pull the two engaging members towards the primary spectacle frame so as to apply an urging pressure against the primary spectacle frame for holding the frame body of the primary spectacle frame between the shelter frame and the engaging members, so as to securely mounting the shelter frame in front of the primary spectacle frame.

DETAILED DESCRIPTION OF THE PREFERRED EMBODIMENT

Figure 1:
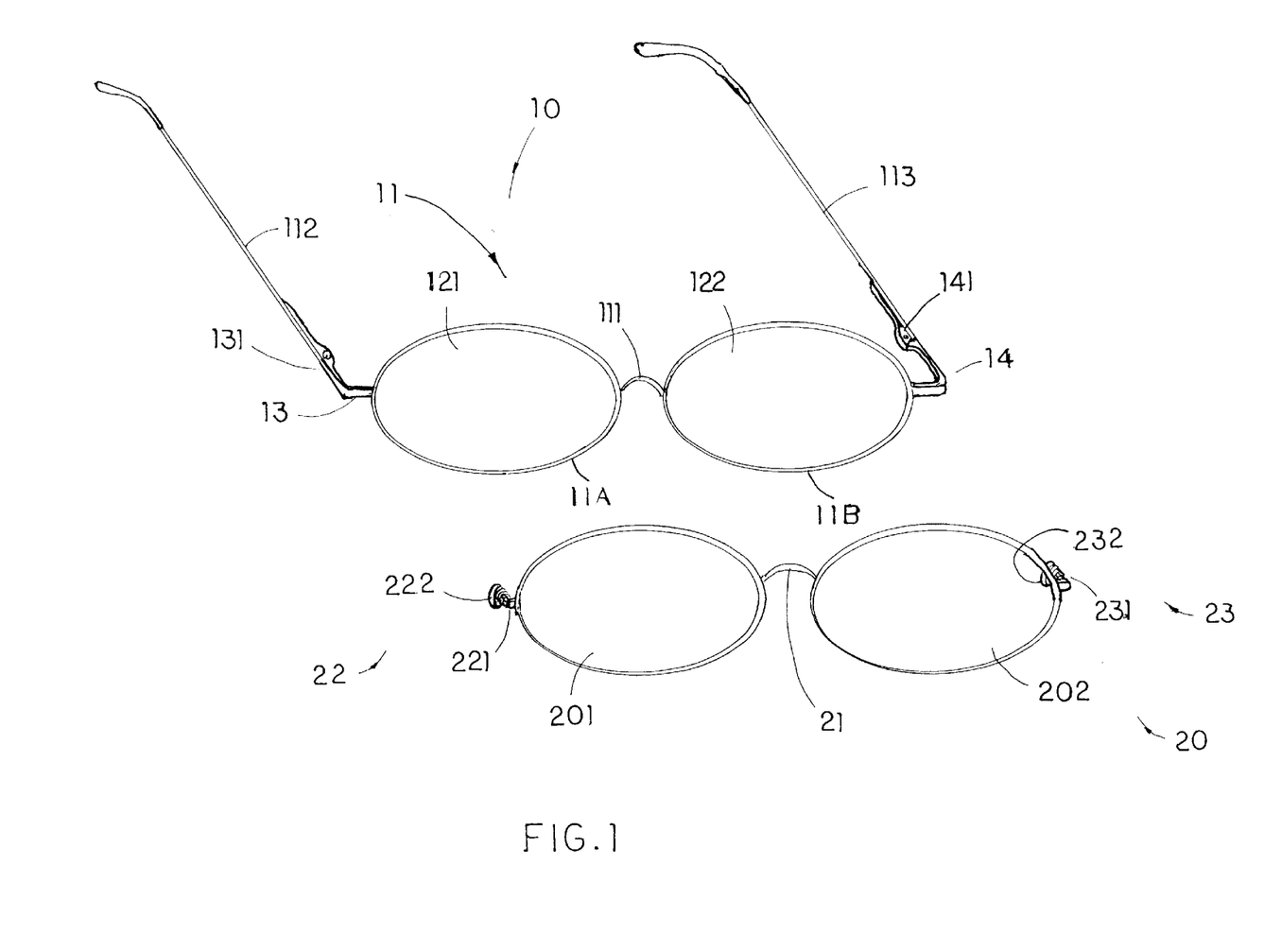
FIG. 1 is a perspective view illustrating a detachable shelter frame constructed for mounting on a primary spectacle frame according to a first preferred embodiment of the present invention.
Figure 2:
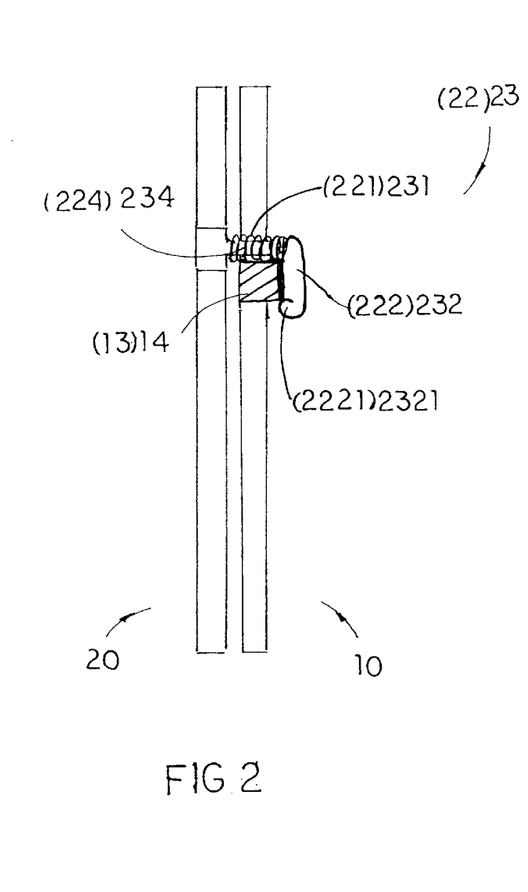
FIG. 2 is a partially sectional view of the detachable shelter frame mounted on the primary spectacle frame according to the above first preferred embodiment of the present invention.

Referring to FIGS. 1 and 2 of the drawings, a detachable shelter frame 20 adapted for mounting on a primary spectacle frame 10 according to a first preferred embodiment of the present invention is illustrated. The primary spectacle frame 10 comprises a frame body 11 for mounting a pair of lenses 121, 122 in position. The frame body 11 comprises a primary bridge 111 connected between the two lenses 121, 122, and two side extensions 13, 14 provided at two outer sides of the lenses 121, 122 respectively each having a hinge portion 131, 141 extended rearwardly therefrom for pivotally coupling a temple 112, 113.

Practically, the frame body 11 can be constructed as a conventional spectacle frame to have a pair of lens rims 11A, 11B as shown in FIG. 1 or a rimless frame that the primary bridge 111 and the two side extensions 13, 14 are directly fastened to the edges of the two lenses 121, 122. In other words, the primary spectacle frame 10 does not require to modify its original structure for mounting the detachable shelter frame 20 thereon. So, the detachable shelter frame 20 of the present invention fits for all kinds of conventional primary spectacle frame 10. In other words, the user does not need to buy a set of expensive primary spectacle frame and corresponding shelter frame. The user can merely additionally purchase a shelter frame 20 of the present invention to fit his or her current spectacle frame that he or she has originally.

As shown in FIGS. 1 and 2, the detachable shelter frame 20 for supporting two auxiliary lenses 201, 202 comprises a bridge 21 extended between the two auxiliary lenses 201, 202, a pair of resilient mounting device 22, 23 connected thereto for mounting the shelter frame 20 on the primary spectacle frame 10.

Each of the resilient mounting devices 22, 23 comprises a resilient arm 221, 231 extending rearwardly from the respective auxiliary lens 201, 202 of the shelter frame 20 to ride on the primary spectacle frame 10, and an engaging member 222, 232 which is connected to the resilient arm 221, 231 and extended to press against a rear side of the primary spectacle frame 10, as shown in FIG. 2, wherein the two resilient arms 221, 231 substantially pull the two engaging members 222, 232 towards the primary spectacle frame 10 so as to apply an urging pressure against the primary spectacle frame 10 for holding the frame body 11 of the primary spectacle frame 10 between the shelter frame 20 and the engaging members 222, 232, so as to securely mounting the shelter frame 20 in front of the primary spectacle frame 10.

According to the first preferred embodiment as shown in FIGS. 1 and 2, the two resilient mounting devices 22, 23 are provided at two outer sides of the two auxiliary lenses 201, 202 respectively for locking with the two side extensions 13, 14 of the primary spectacle frame 10 so as to securely mount the shelter frame 20 on the primary spectacle frame 10. The auxiliary lenses 201, 202 can be shaded lenses supported by the shelter frame 20 to form a detachable sunglasses.

According to the first preferred embodiment as shown in FIGS. 1 and 2, the two resilient arms 221, 231 are compression springs horizontally and rearwardly extended from the two outer sides of the shelter frame 20, wherein each of the resilient arms 221, 231 has a front end attaching to the shelter frame 20 and a rear end connecting to the respective engaging member 222, 232. Therefore, the resilient arms 221, 231 will normally pull the shelter frame 20 and the engaging members 222, 232 together so as to retain a shortest distance between the shelter frame 20 and the primary spectacle frame 10.

The two resilient arms 221, 231 will pull the two engaging members 222, 232 to urge against the two side extensions 13, 14 so as to securely engage the two engaging members 222, 232 with the two side extensions 13, 14 from behind respectively when the shelter frame 20 is mounted on the primary spectacle frame 10. Furthermore, the resilient arms 221, 231 are adapted for bending in an upward and a downward direction, so as to self-adjust the engaging members 222, 232 to lock up with the side extensions 13, 14 respectively. Preferably, the compression spring of each of the resilient arms 221, 231 may a diameter gradually decrease from a mid-portion thereof to two ends of the compression spring so as to enhance the elasticity of the resilient arm 221, 231.

Each engaging member 222, 232 is downwardly and suspendedly affixed at the rear end of the resilient arm 221, 231, preferably welded to the resilient arm 221, 231. Moreover, each of the engaging members 222, 232 has an engagement tip 2221, 2321 formed at a bottom end thereof for hooking a bottom edge of the respective side extension 13, 14, so as to lock up the position of the two resilient mounting device 22, 23 of the shelter frame 20 on the primary spectacle frame 10, as shown in FIG. 2, and to securely mount the shelter frame 20 on the primary spectacle frame 10. It is worth to mention that the engaging members 223, 233 can have a bigger or smaller size according to size of the side extensions 13, 14 of the primary spectacle frame 10.

Moreover, each of the resilient mounting devices 22, 23 further comprises an arm guider 224, 234 for guiding the extension and compression of the respective resilient arm 221, 231 and rigidly supporting the resilient arm 221, 231 to ride across the respective side extension 13, 14, as shown in FIG. 2. The two arm guiders 224, 234 are two guiding pins rearwardly protruded from two outer sides of the shelter frame 20 and inserted into the front ends of the resilient arms 221, 231 respectively when compression springs are used as the resilient arms 221, 231.

Accordingly, the resilient mounting devices 22, 23 of the shelter frame 20 of the present invention not only firmly attach the shelter frame 20 in front of the primary spectacle frame 10 by applying urging pressure on the side extensions 13, 14 in a horizontal direction, but also minimize a gap between the primary spectacle frame 10 and the shelter frame 20, which will deflect the incoming light, so as to provide a better protection to the user's eyes.

Figure 3:
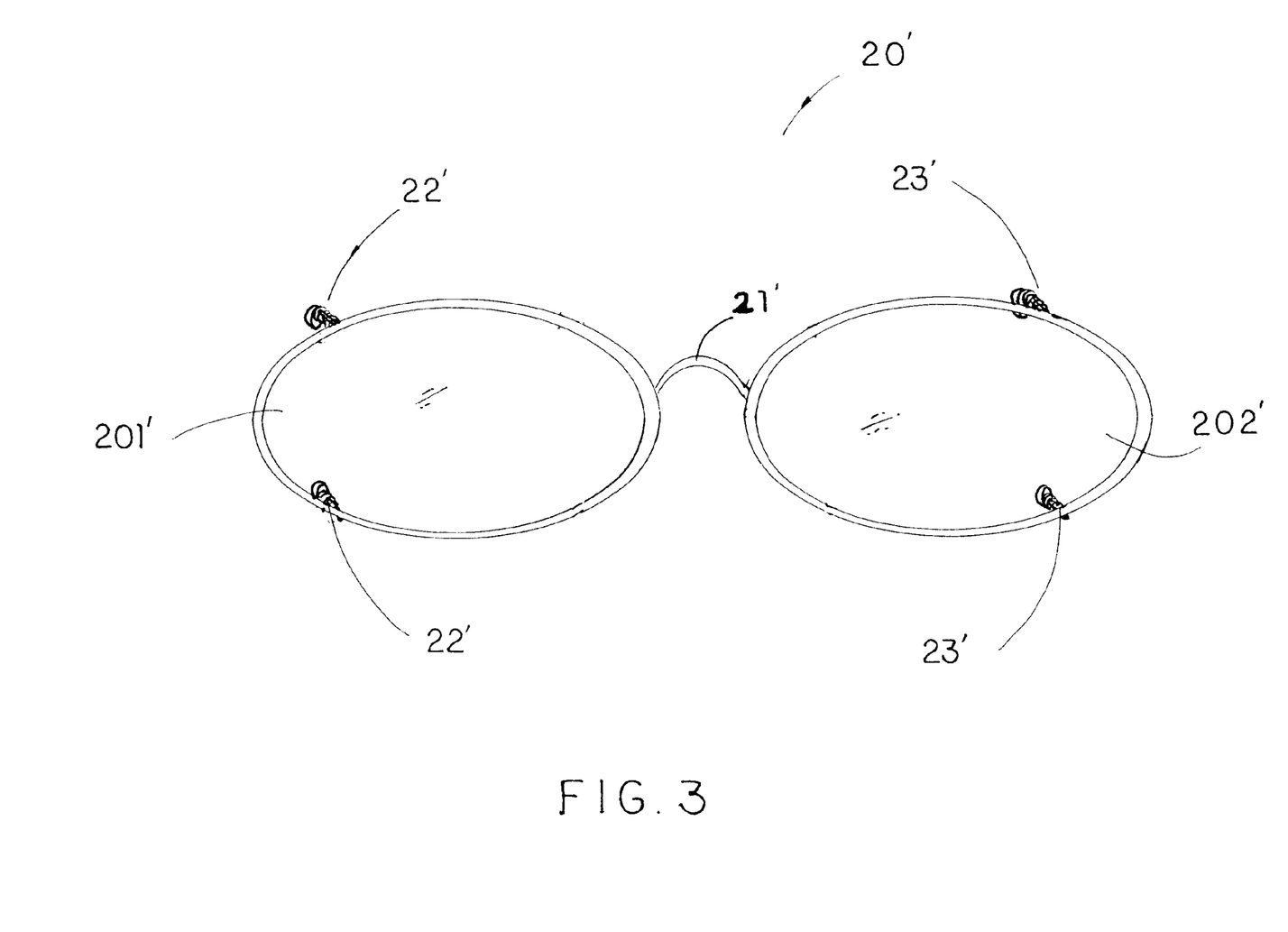
FIG. 3 is a perspective view of a detachable shelter frame according to a first alternative mode of the above first preferred embodiment of the present invention.
Figure 4:
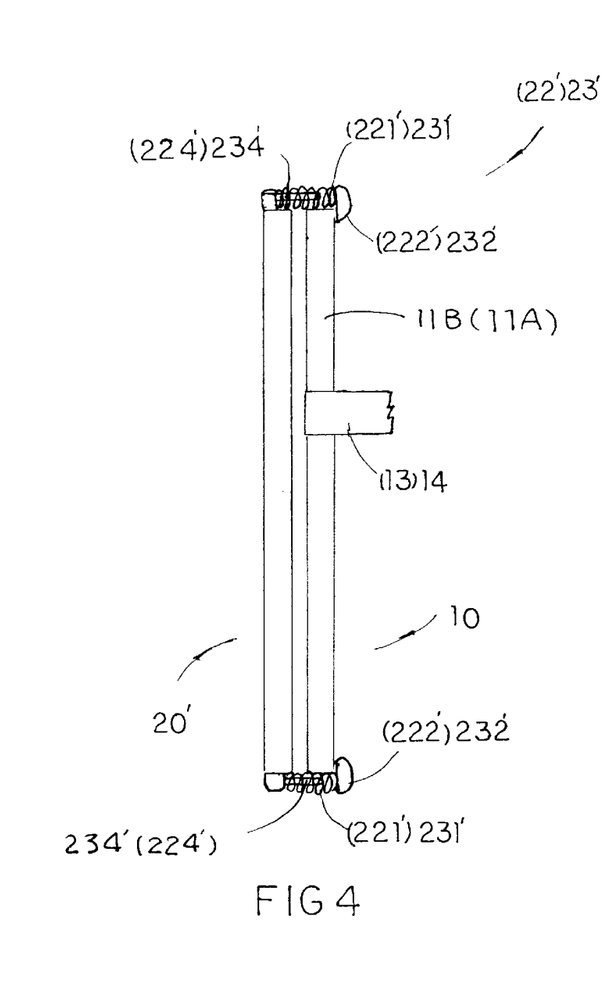
FIG. 4 is a partially sectional view of the detachable shelter frame mounted on the primary spectacle frame according to the first alternative mode of the above first preferred embodiment of the present invention.

Referring to FIGS. 3 and 4, a detachable shelter frame 20' according to a first alternative mode of the above first preferred embodiment is illustrated, wherein the engagement concept and the structure of the resilient mounting devices 22', 23' of this first alternative mode are the same as the above first embodiment. The first alternative mode illustrates an alternative location of the resilient mounting devices 22', 23' for mounting on the primary spectacle frame 10. Alternatively, the resilient mounting devices 22', 23' according to the first alternative mode of the first preferred embodiment are arranged to attach to the frame body 11 of the primary spectacle frame 10 instead of the side extensions 13, 14.

As shown in FIG. 3, there are two pairs of the resilient mounting device 22', 23' affixed to upper and lower portions of the two outer sides of the two auxiliary lenses 201', 202' respectively, for locking with the upper side and the lower side of the two lens rims 11A, 11B of the frame body 11 of the primary spectacle frame 10. To securely mount the shelter frame 20' on the primary spectacle frame 10, as shown in FIG. 4, the four resilient arms 221', 231' and the four arm guiders 224', 234' inserted therein are rested across the upper sides and lower sides of the two lens rims 11A, 11B of the frame body 11 while the four engaging members 222'. 232' are rearwardly extended to urge against the rear sides of the two lens rims 11A, 11B of the frame body 11, so as to firmly engage the frame body 11 between the shelter frame 20' and the four engaging members 222', 232'. In other words, the four resilient mounting device 22',23' are adapted for locking the shelter frame 10' on the primary spectacle frame 10 by preventing any upward, downward, leftward, and rightward movement of the shelter frame 20'.

One of the advantages of the first alternative mode of the first preferred embodiment is that the resilient arms 221', 231' of the resilient mounting device 22',23' can be shortened to merely fit the thickness of the lens rims 11A, 11B and do not have to be lengthened to fit the thickness of the side extensions 13, 14 of the primary spectacle frame 10. Another advantage of the first alternative mode of the first preferred embodiment in comparison with the conventional clip-on shelter frame is that the flexibility of the resilient arms 221', 231' eliminate the resilient bridge of the shelter frame which generally adversely affect the ornamental appearance of the primary spectacle frame. As shown in FIG. 3, the bride 21' of the shelter frame 20' can be constructed to match the primary bride 111 of the primary spectacle frame 10.

Figure 5:
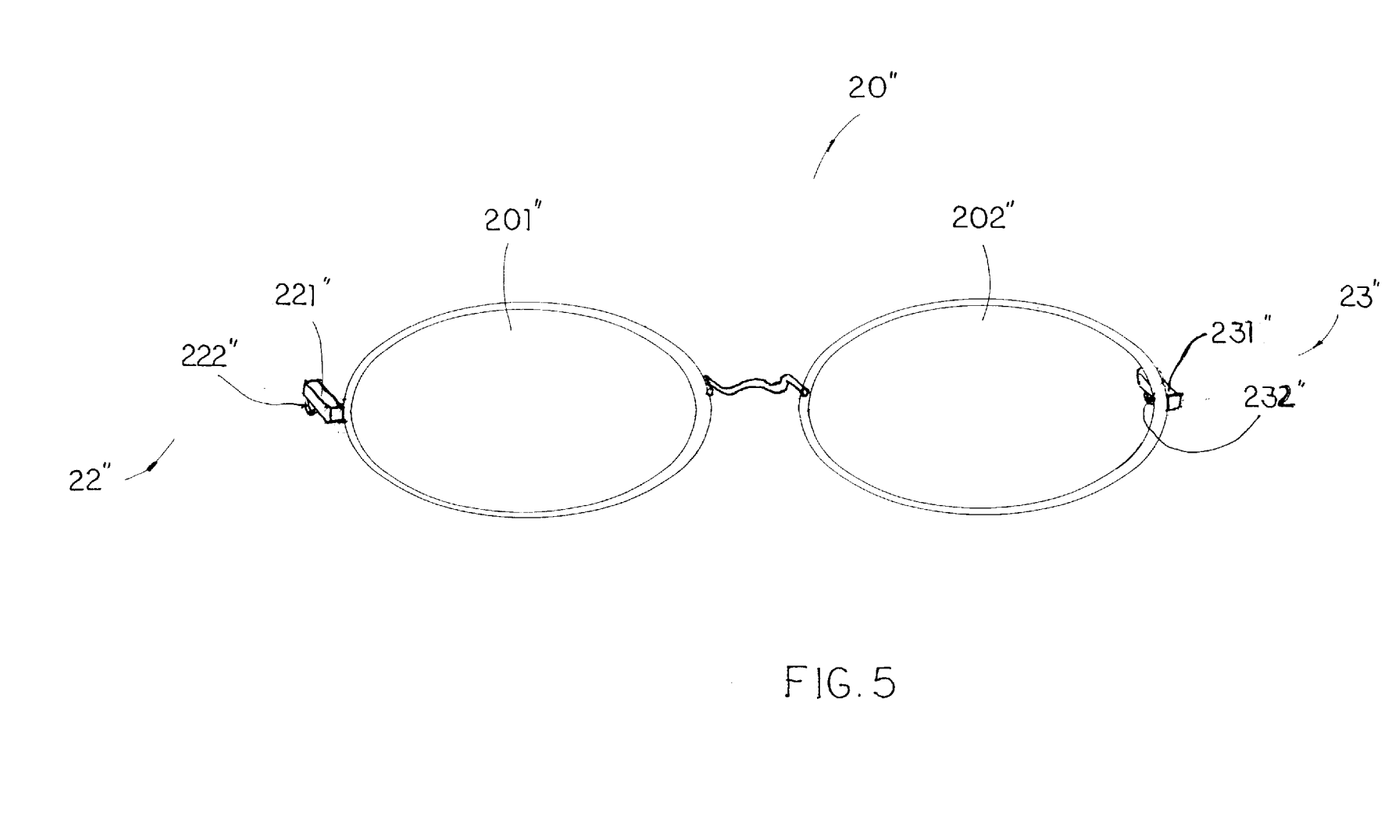
FIG. 5 is a perspective view of a detachable shelter frame according to a second preferred embodiment of the present invention.
Figure 6:
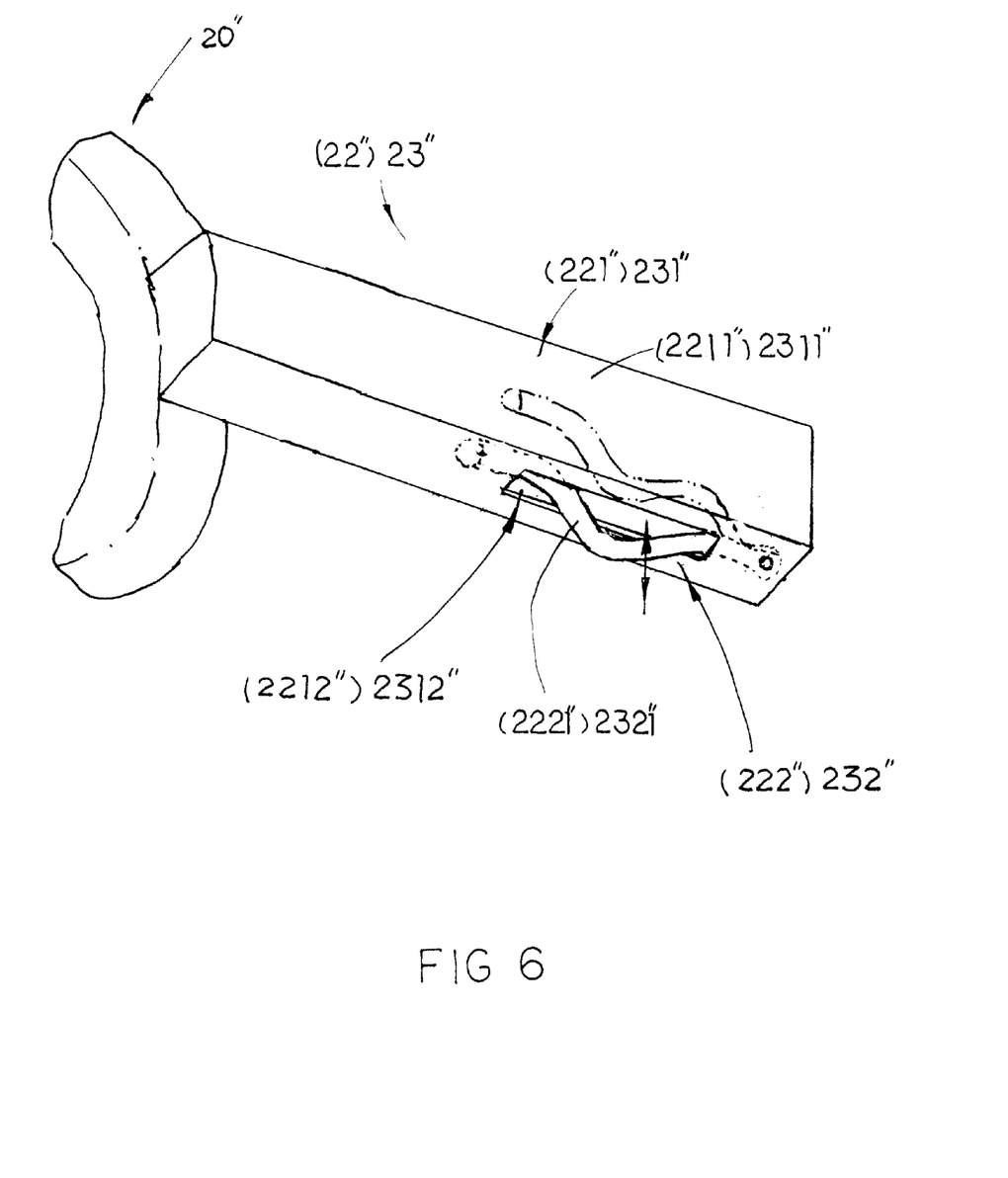
FIG. 6 is a partial perspective view of the resilient mounting device of the detachable shelter frame according to the above second preferred embodiment of the present invention.
Figure 7:
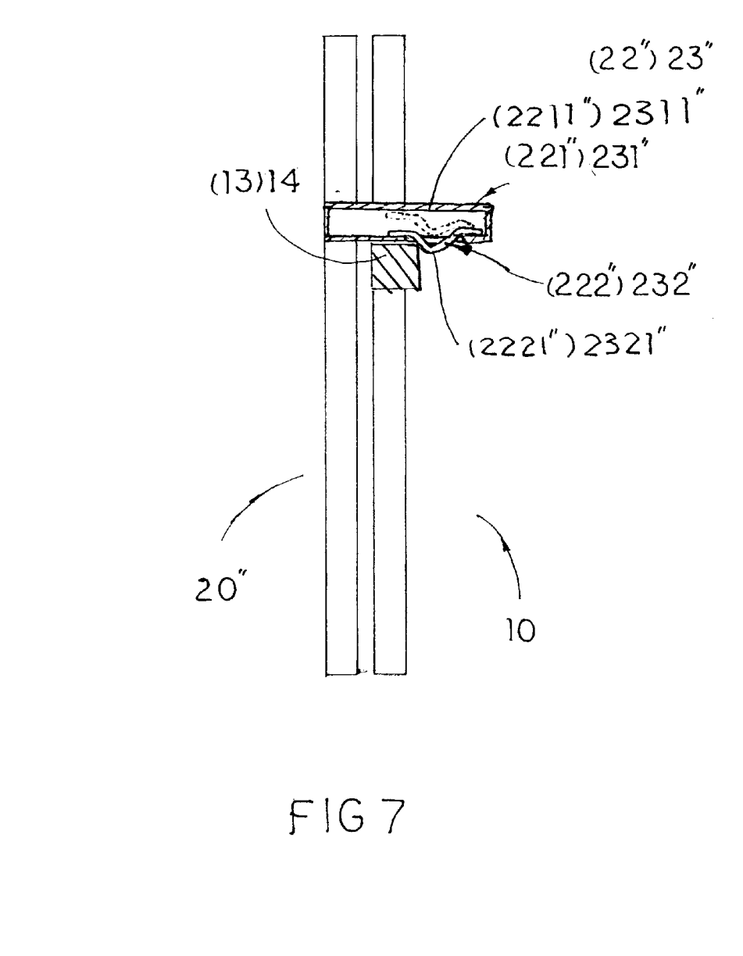
FIG. 7 is a partially sectional view of the detachable shelter frame mounted on the primary spectacle frame according to the above second preferred embodiment of the present invention.

Referring to FIGS. 5 to 7, a shelter frame 20" according to a second preferred embodiment of the present invention is illustrated, which also comprises a pair of resilient mounting devices 22", 23" each also including a resilient arm 221", 231" extending rearwardly from two outer sides of the respective auxiliary lens 201", 202" of the shelter frame 20" to ride on the primary spectacle frame 10 and an engaging member 222", 232" adapted for applying an urging pressure against the respective side extensions 13, 14 of the primary spectacle frame 10. In which, each of the resilient arm 221", 231" comprises an arm housing 2211", 2311" to receive the respective engaging member 222", 232" therein. Each of the engaging members 222", 232" is spring member having a V-shaped engagement tip 2221", 2321" protruded downwardly from the arm housing 2211", 2311" through an arm slot 2212", 2312" provided at an engagement surface of the arm housing 2211", 2311".

A rear end of each of the engaging members 222", 232" is affixed to a rear end of the arm housing 2211", 2311" by welding or other similar means in such a manner that the engagement tips 222", 232" are elastically suspended out of the arm slots 2212", 2312" respectively while a front end of each of the engaging members 222", 232" is sit on the engagement surface of the respective arm housing 2211", 2311". Therefore, the engagement tips 2221", 2321" are normally protruded down from the arm housings 2211", 2311" through the arm slots 2212", 2312" to provide a clipping engagement with the side extensions 13, 14 respectively. However, when a relatively large upward force is apply to the engagement tip 2221", 2321", they can be pressed up into the arm housing 2211", 2311" to facilitate the mounting operation of the shelter frame 20".

As shown in FIGS. 6 and 7, when the resilient arms 221", 231" ride on the side extensions 13, 14 of the primary spectacle frame 10, the engagement tips 2221", 2321" will apply an urging pressure against the side extensions 13, 14 from behind respectively so as to engage the side extensions 13, 14 between the shelter frame 20" and the engagement tips 2221", 2321" of the two engaging members 222", 232". Practically,. when the shelter frame 20" is mounted on the primary spectacle frame 10, as shown in FIG. 7, the engaging members 222", 232" of the resilient mounting device 22", 23" will horizontally apply the urging pressure on the side extensions 13, 14 of the primary spectacle frame 10 in order to securely mount the shelter frame 20" on the primary spectacle frame 10. Thus, the resilient elements 222", 232" will also tend to pull the shelter frame 20 toward to the primary spectacle frame 10, so as to minimize a distance between the shelter frame 20" and the primary spectacle frame 10. In other words, such arrangement can minimize a gap between the primary spectacle frame 10 and the shelter frame 20" to reduce deflection the incoming light to provide a better protection for the eyes.

Figure 8:
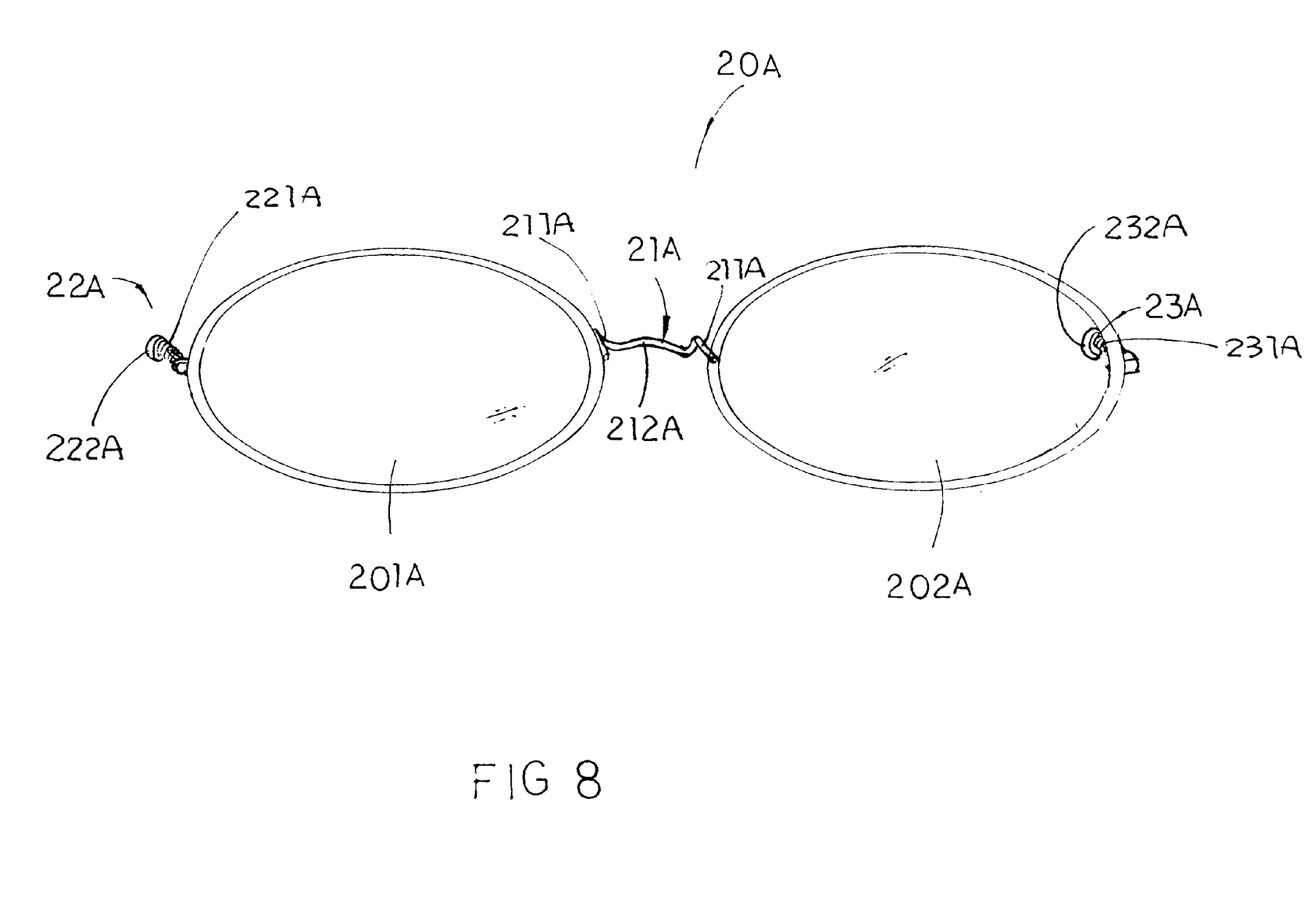
FIG. 8 is a perspective view illustrating an alternative mode of bridge of the detachable shelter frame according to the above preferred embodiments of the present invention.
Figure 9:
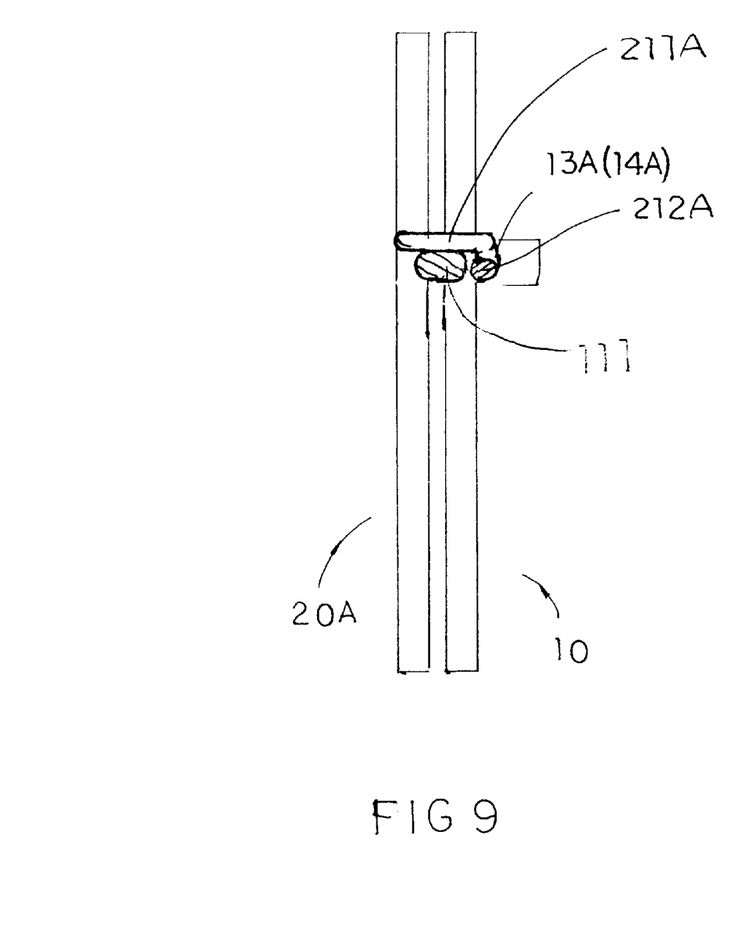
FIG. 9 is a partially sectional view illustrating the clip bridge of the detachable shelter frame mounted on the primary bridge of the primary spectacle frame according to the above preferred embodiments of the present invention.

Referring to FIGS. 8 and 9, a shelter frame 20A according to an alternative mode of the above first and second embodiments of the present invention is illustrated, wherein the shelter frame 20A further comprises a clip-bridge 21A to substitute the bridge 21 of the above embodiments.

The clip-bridge 21A which is generally in U-shaped comprises two rearwardly extending side wires 211A adapted for supporting on two ends of the primary bridge 111 of the frame body 11 and a downwardly curved clipping wire 212A extending behind the primary bridge 111, wherein the clip-bridge 21A is arranged to securely clip on the primary bridge 111 when the shelter frame 20A is mounted in front of the primary spectacle frame 10, so that the shelter frame 20A can be mounted even more securely on the primary spectacle frame 10. Moreover, besides the two side extensions 13, 14 of the primary spectacle frame 10, part of the weight of the shelter frame 20A can be supported by the primary bridge 111 through the clip bridge 21A. It can help the shelter frame 20A to be mounted on the primary spectacle frame 10 in a more stable manner.

As shown in FIG. 8, the two resilient mounting device 22A, 23A, which are provided at two outer sides of the two auxiliary lenses 201, 202 respectively, are adapted for holding the shelter frame 21A on the primary spectacle frame 10 in position, so as to prevent upward and downward movements of the shelter frame 20A, wherein each resilient mounting device 22A, 23A comprises a resilient arm 221A, 231A which is a compression spring rearwardly extended for passing underneath a bottom of the respective side extension 13, 14 of the primary spectacle frame 10, and an engaging member 222A, 232A connected to a rear end of the resilient arm 221A, 231A for locking with the respective side extension 13, 14 from behind, as illustrated in the description of the above first embodiment.

Figure 10:
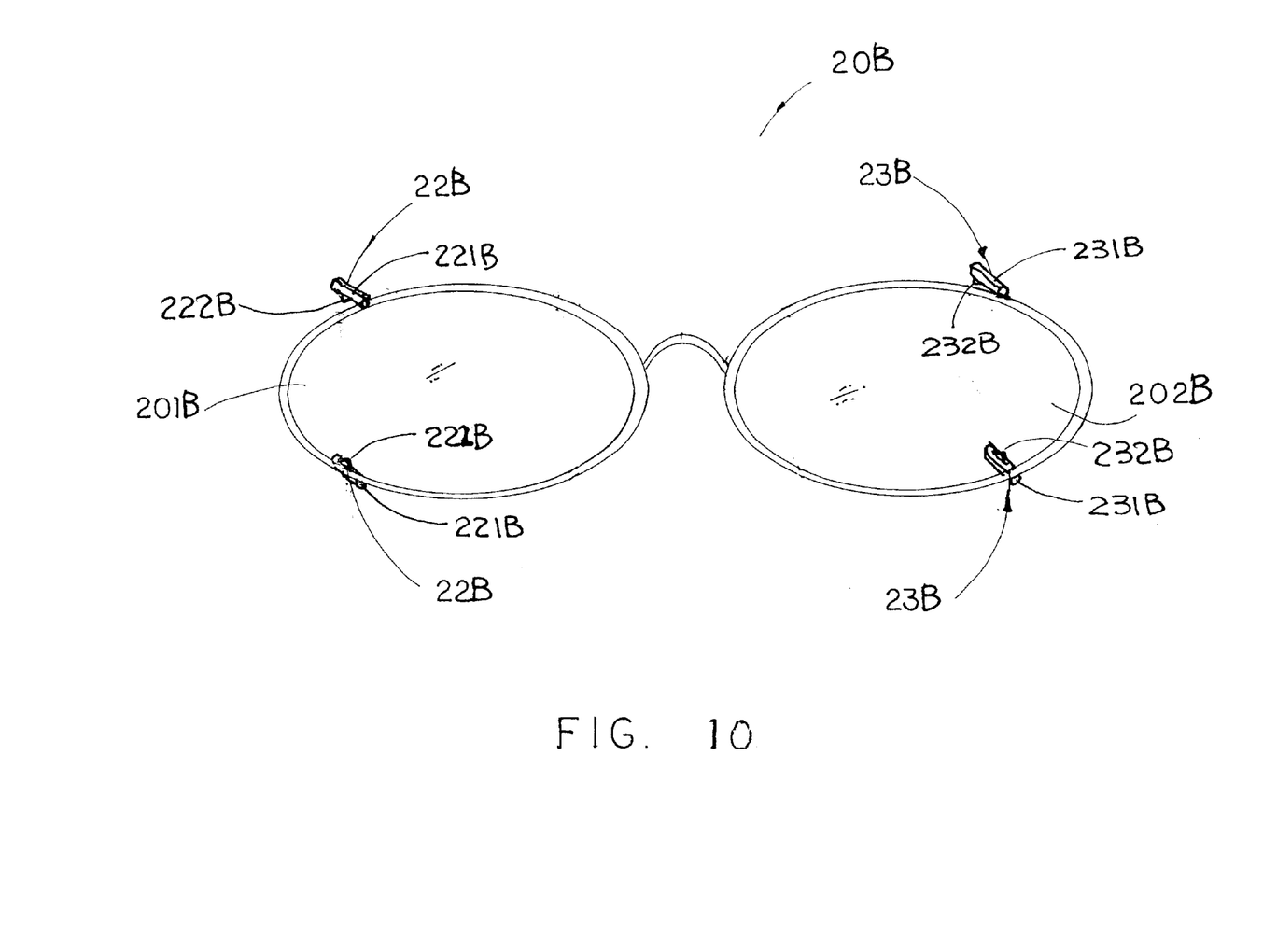
FIG. 10 is a perspective view of a first alternative mode of the above second preferred embodiment of the present invention.
Figure 11:
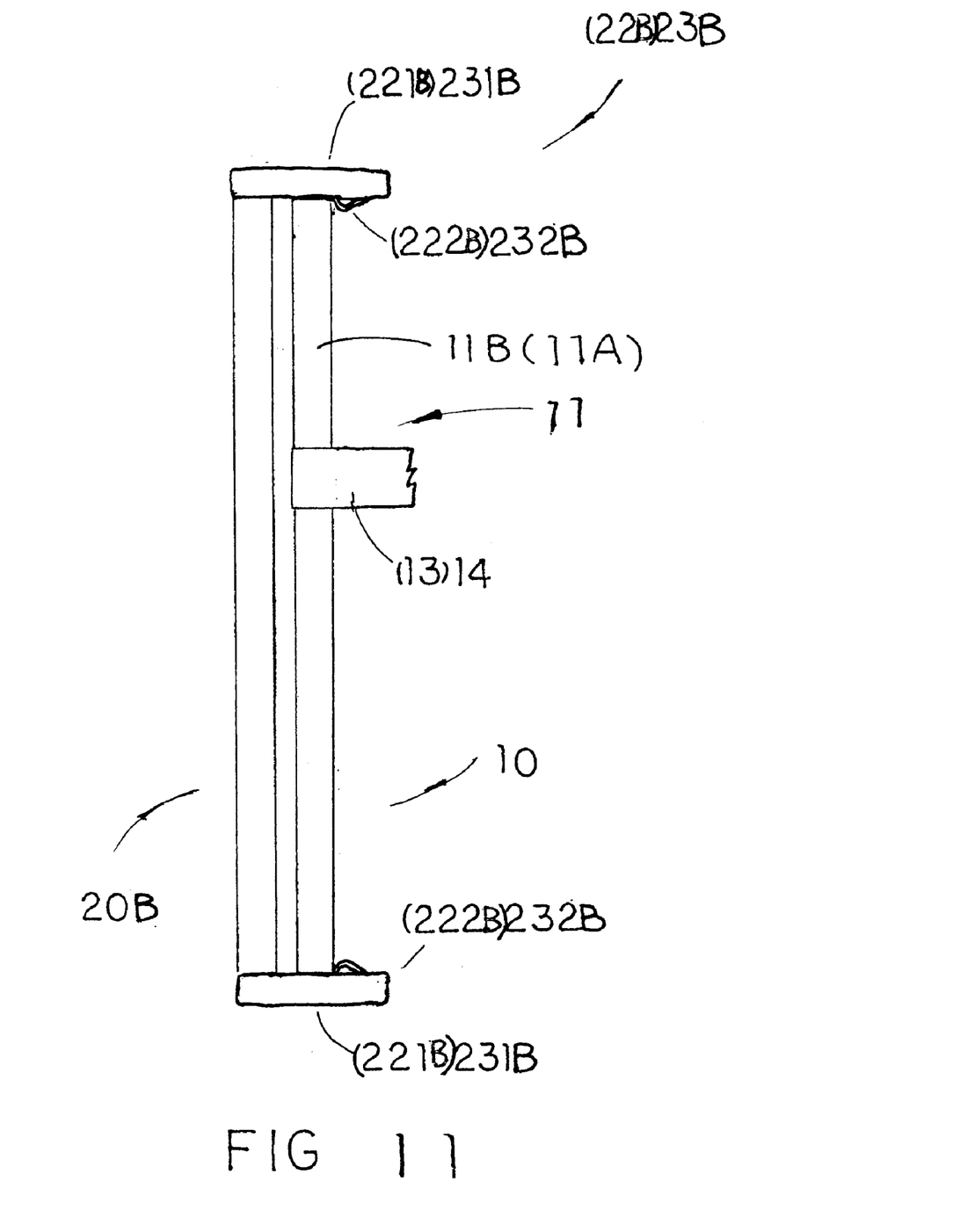
FIG. 11 is a partial side view of the first alternative mode of the above second preferred embodiment of the present invention.

Referring to FIGS. 10 and 11, a detachable shelter frame 20B according to an alternative mode of the above second preferred embodiment is illustrated, wherein there are two pairs of resilient mounting devices 22B, 23B each having an identical structure as shown in FIGS. 6 and 7 of the above second preferred embodiment that comprises a resilient arm 221B, 231B and an engaging member 222B, 232B. The four resilient arms 221B, 231B of the two pairs of resilient mounting devices 22B, 23B are affixed to upper and lower portions of the two outer sides of the two auxiliary lenses 201B, 202B respectively, wherein the two engaging members 222B, 232B of the two resilient arms 221B, 231B affixed to the upper portions of the two auxiliary lenses 201B, 202B are arranged to face downwards for locking with the upper sides of the two lens rims 11A, 11B of the frame body 11 of the primary spectacle frame 10, and that the two engaging members 222B, 232B of the other two resilient arms 221B, 231B affixed to the lower portions of the two auxiliary lenses 201B, 202B are arranged to face upwards for locking with the lower sides of the two lens rims 11A, 11B of the frame body 11 of the primary spectacle frame 10.

Figure 12:
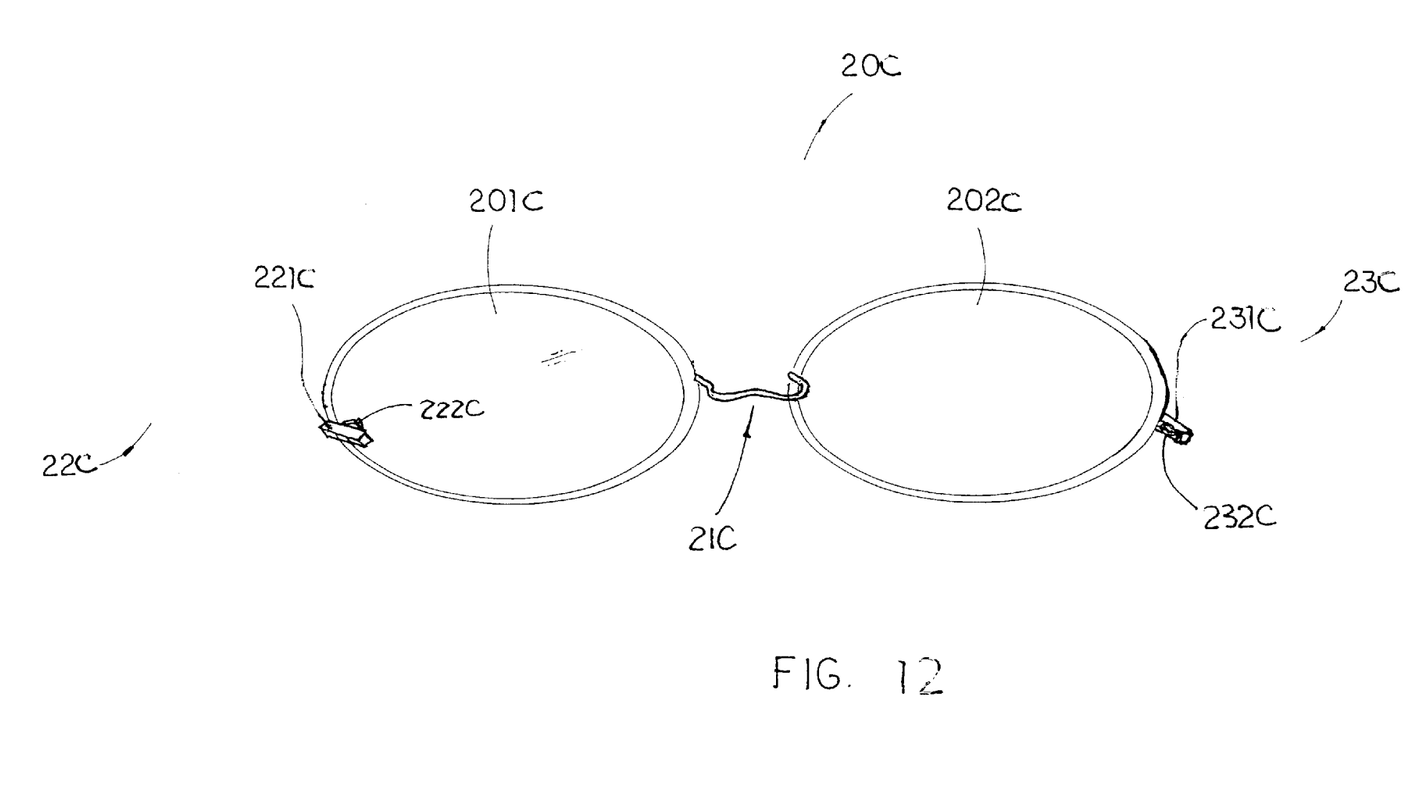
FIG. 12 is a perspective view of a second alternative mode of the above second preferred embodiment of the present invention.

Referring to FIG. 12, a detachable shelter frame 20C according to a second alternative mode of the above second preferred embodiment is illustrated, which comprises two auxiliary lenses 201C, 202C, a pair of resilient mounting devices 22C, 23C, and a clip-bridge as disclosed in FIGS. 8 and 9 connected between the two auxiliary lenses 201C, 202C. Each of the resilient mounting devices 22C and 23C has a structure identical to that of the second preferred embodiment as shown in FIGS. 6 and 7, each of which comprises a resilient arm 221C, 231C and an engaging member 222C, 232C. In which, the two resilient arm 221C, 231C are affixed to lower portions of the two outer sides of the two auxiliary lenses 201C, 202C respectively while the two engaging members 222C, 232C are arranged to protrude upwards for locking with the lower sides of the two lens rims 11A, 11B of the frame body 11 of the primary spectacle frame 10. The shelter frame 20C can be attached in front of the primary spectacle frame 10 by hanging the clip-bridge 21C of the shelter frame 20C to the primary bridge 111 of the primary spectacle frame 10 and engaging the lower sides of the two lens rims 11A, 11B of the frame body 11 of the primary spectacle frame 10 by the two resilient mounting devices 22C, 23C in order to securely and firmly mount the shelter frame 20C on the primary spectacle frame 10.

In view of above, the above disclosed detachable shelter frame can substantially achieve the following features:

(a) The detachable shelter frame can be precisely and easily attached on a primary spectacle frame by means of resilient mounting devices so as to securely mount on the primary spectacle frame without the use of any magnet and the risk of scratching the lenses of the primary spectacle frame like the conventional clip-on sunglasses.

(b) The wearer may merely use one hand to attach or detach the shelter frame during exercising or driving.

(c) The detachable shelter frame of the present invention is designed for all kinds of the primary spectacle frame because no specific modification is required for the primary spectacle frame to adapt the shelter frame, so that no magnet is required to position in front of the user's eyes all the time.

(d) It does not require changing the original structural design of the primary spectacle frame, so as to minimize the purchasing cost for the users.

What is claimed is:

1. A detachable shelter frame for mounting in front of a primary spectacle frame which comprises a frame body comprising a bridge connected between two lenses and two side extensions, which are provided at two outer sides of said lenses respectively, each having a hinge portion extended rearwardly therefrom for pivotally coupling a temple; wherein said shelter frame which supports two auxiliary lenses comprises:

a bridge extended between said two auxiliary lenses; and a pair of resilient mounting devices connected thereto for mounting said shelter frame on said primary spectacle frame, wherein each of said resilient mounting devices comprises:

a resilient arm extending rearwardly from said respective auxiliary lens of said shelter frame for riding on said primary spectacle frame, and an engaging member which is connected to said resilient arm for pressing against a rear side of said primary spectacle frame in such a manner that said two resilient arms substantially pull said two engaging members towards said primary spectacle frame so as to apply an urging pressure against said primary spectacle frame for holding said frame body of said primary spectacle frame between said shelter frame and said engaging members, so as to securely mounting said shelter frame in front of said primary spectacle frame.

2. The detachable shelter frame, as recited in claim 1, wherein said two resilient mounting devices are provided at two outer sides of said two auxiliary lenses respectively for locking with said two side extensions of said primary spectacle frame so as to securely mount said shelter frame on said primary spectacle frame, wherein said two resilient arms are compression springs horizontally and rearwardly extended from said two outer sides of said shelter frame, wherein each of said resilient arms has a front end attaching to said shelter frame and a rear end connecting to said respective engaging member, thereby said two resilient arms pull said two engaging members to urge against said two side extensions so as to securely engage said two engaging members with said two side extensions from behind respectively when said shelter frame is mounted on said primary spectacle frame.

3. The detachable shelter frame, as recited in claim 2, wherein each of said engaging members is downwardly and suspendedly affixed at said rear end of said resilient arm, and that each of said engaging members has an engagement tip formed at a bottom end thereof for hooking a bottom edge of said respective side extension so as to lock up said position of said two resilient mounting device of said shelter frame on said primary spectacle frame and to securely mount said shelter frame on said primary spectacle frame.

4. The detachable shelter frame, as recited in claim 3, wherein each of said resilient mounting devices further comprises an arm guider for guiding said extension and compression of said respective resilient arm and rigidly supporting said resilient arm to ride across said respective side extension, wherein each of said two arm guiders comprises a guiding pin rearwardly protruded from said shelter frame and inserted into said respective said resilient arms.

5. The detachable shelter frame, as recited in claim 3, wherein said bridge is a clip-bridge which is generally in U-shaped comprises two rearwardly extending side wires adapted for supporting on two ends of said primary bridge of said frame body and a downwardly curved clipping wire for extending behind said primary bridge, wherein said clip-bridge is arranged to securely clip on said primary bridge when said shelter frame is mounted in front of said primary spectacle frame.

6. The detachable shelter frame, as recited in claim 2, wherein each of said resilient mounting devices further comprises an arm guider for guiding said extension and compression of said respective resilient arm and rigidly supporting said resilient arm to ride across said respective side extension.

7. The detachable shelter frame, as recited in claim 6, wherein each of said two arm guiders comprises a guiding pin rearwardly protruded from said shelter frame and inserted into said respective said resilient arms.

8. The detachable shelter frame, as recited in claim 1, wherein said resilient mounting devices are arranged to attach to two lens rims of said frame body of said primary spectacle frame, wherein said two resilient arms are compression springs horizontally and rearwardly extended from two upper portions of two outer sides said shelter frame, wherein each of said resilient arms a rear end connecting to said respective engaging member, thereby said two resilient arms pull said two engaging members to urge against two upper sides of said two lens rims of said frame body of said primary spectacle frame.

9. The detachable shelter frame, as recited in claim 8, wherein each of said engaging members is downwardly and suspendedly affixed at said rear end of said resilient arm, and that each of said engaging members has an engagement tip formed at a bottom end thereof for hooking a rear side of said respective lens rim of said primary spectacle frame so as to lock up said position of said two resilient mounting devices of said shelter frame on said primary spectacle frame and to securely mount said shelter frame on said primary spectacle frame.

10. The detachable shelter frame, as recited in claim 9 wherein each of said resilient mounting devices further comprises an arm guider for guiding said extension and compression of said respective resilient arm and rigidly supporting said resilient arm to ride across said respective side extension, wherein each of said two arm guiders comprises a guiding pin rearwardly protruded from said shelter frame and inserted into said respective said resilient arms.

11. The detachable shelter frame, as recited in claim 9, wherein said bridge is a clip-bridge which is generally in U-shaped comprises two rearwardly extending side wires adapted for supporting on two ends of said primary bridge of said frame body and a downwardly curved clipping wire for extending behind said primary bridge, wherein said clip-bridge is arranged to securely clip on said primary bridge when said shelter frame is mounted in front of said primary spectacle frame.

12. The detachable shelter frame, as recited in claim 8, wherein each of said resilient mounting devices further comprises an arm guider for guiding said extension and compression of said respective resilient arm and rigidly supporting said resilient arm to ride across said respective side extension.

13. The detachable shelter frame, as recited in claim 12, wherein each of said two arm guiders comprises a guiding pin rearwardly protruded from said shelter frame and inserted into said respective said resilient arms.

14. The detachable shelter frame, as recited in claim 1, further comprising two resilient mounting device, wherein said four resilient mounting device are affixed to upper and lower portions of said two outer sides of said two auxiliary lenses respectively, for locking with an upper side and a lower side of two lens rims of said frame body of said primary spectacle frame, wherein said four resilient arms are compression springs horizontally and rearwardly extended from said upper and lower portions of said two outer sides said shelter frame, wherein each of said resilient arms has a rear end connecting to said respective engaging member, thereby said four resilient arms pull said four engaging members to urge against said upper and lower sides of said two lens rims of said frame body of said primary spectacle frame.

15. The detachable shelter frame, as recited in claim 14, wherein each of said engaging members is suspendedly affixed at said rear end of said resilient arm, and that each of said engaging members has an engagement tip formed for hooking a rear side of said respective lens rim of said primary spectacle frame so as to lock up said position of said four resilient mounting devices of said shelter frame on said primary spectacle frame and to securely mount said shelter frame on said primary spectacle frame.

16. The detachable shelter frame, as recited in claim 15, wherein each of said resilient mounting devices further comprises an arm guider for guiding said extension and compression of said respective resilient arm and rigidly supporting said resilient arm to ride across said respective side extension, wherein each of said two arm guiders comprises a guiding pin rearwardly protruded from said shelter frame and inserted into said respective said resilient arms.

17. The detachable shelter frame, as recited in claim 15, wherein said bridge is a clip-bridge which is generally in U-shaped comprises two rearwardly extending side wires adapted for supporting on two ends of said primary bridge of said frame body and a downwardly curved clipping wire for extending behind said primary bridge, wherein said clip-bridge is arranged to securely clip on said primary bridge when said shelter frame is mounted in front of said primary spectacle frame.

18. The detachable shelter frame, as recited in claim 14, wherein each of said resilient mounting devices further comprises an arm guider for guiding said extension and compression of said respective resilient arm and rigidly supporting said resilient arm to ride across said respective side extension.

19. The detachable shelter frame, as recited in claim 18, wherein each of said two arm guiders comprises a guiding pin rearwardly protruded from said shelter frame and inserted into said respective said resilient arms.

20. The detachable shelter frame, as recited in claim 1, wherein said bridge is a clip-bridge which is generally in U-shaped comprises two rearwardly extending side wires adapted for supporting on two ends of said primary bridge of said frame body and a downwardly curved clipping wire for extending behind said primary bridge, wherein said clip-bridge is arranged to securely clip on said primary bridge when said shelter frame is mounted in front of said primary spectacle frame.

21. The detachable shelter frame, as recited in claim 1, wherein said two resilient arms are extended rearwardly from two outer sides of said respective auxiliary lens of said shelter frame for engaging with said frame body of said primary spectacle frame, wherein each of said resilient arm comprises an arm housing to receive said respective engaging member therein, and that each of said engaging members is a spring member having an engagement tip protruded downwardly from said arm housing through an arm slot provided at an engagement surface of said arm housing for holding on said frame body of said primary spectacle frame so as to mount said shelter frame in front of said primary spectacle frame, however, for detaching said shelter frame from said primary spectacle frame, each of said engagement tips is capable of being pressed into said respective arm housing through said arm slot thereof by a pressing force applied to said respective engagement tip.

22. The detachable shelter frame, as recited in claim 21, wherein each of said spring member has a V-shaped portion to form said respective engagement tip, wherein a rear end of each of said engaging members is affixed to a rear end of said arm housing in such a manner that said engagement tips are elastically suspended out of said arm slots respectively.

23. The detachable shelter frame, as recited in claim 22, wherein said two resilient arms are extended rearwardly to ride on two side extensions of said primary spectacle frame, wherein when said resilient arms ride on said side extensions of said primary spectacle frame, said engagement tips apply an urging pressure against said side extensions from behind respectively so as to engage said side extensions between said shelter frame and said engagement tips of said two engaging members, so as to securely mount said shelter frame on said primary spectacle frame.

24. The detachable shelter frame, as recited in claim 23, wherein said bridge is a clip-bridge which is generally in U-shaped comprises two rearwardly extending side wires adapted for supporting on two ends of said primary bridge of said frame body and a downwardly curved clipping wire for extending behind said primary bridge, wherein said clip-bridge is arranged to securely clip on said primary bridge when said shelter frame is mounted in front of said primary spectacle frame.

25. The detachable shelter frame, as recited in claim 22, wherein said two resilient arms are affixed to lower portions of two outer sides of said two auxiliary lenses respectively while said two engaging members are arranged to protrude towards said auxiliary lenses respectively for locking with lower sides of two lens rims of said frame body of said primary spectacle frame.

26. The detachable shelter frame, as recited in claim 25, wherein said bridge is a clip-bridge which is generally in U-shaped comprises two rearwardly extending side wires adapted for supporting on two ends of said primary bridge of said frame body and a downwardly curved clipping wire for extending behind said primary bridge, wherein said clip-bridge is arranged to securely clip on said primary bridge when said shelter frame is mounted in front of said primary spectacle frame.

27. The detachable shelter frame, as recited in claim 22, further comprising two resilient mounting devices, wherein said four resilient arms of said four resilient mounting devices are affixed to upper and lower portions of said two outer sides of said two auxiliary lenses respectively, wherein said two engaging members of said two resilient arms affixed to said upper portions of said two auxiliary lenses are arranged to face downwards for locking with upper sides of two lens rims of said frame body of said primary spectacle frame, and that said two engaging members of said other two resilient arms affixed to said lower portions of said two auxiliary lenses are arranged to face upwards for locking with lower sides of said two lens rims of said frame body of said primary spectacle frame.

28. The detachable shelter frame, as recited in claim 21, wherein said two resilient arms are extended rearwardly to ride on two side extensions of said primary spectacle frame, wherein when said resilient arms ride on said side extensions of said primary spectacle frame, said engagement tips apply an urging pressure against said side extensions from behind respectively so as to engage said side extensions between said shelter frame and said engagement tips of said two engaging members, so as to securely mount said shelter frame on said primary spectacle frame.

29. The detachable shelter frame, as recited in claim 28, wherein said bridge is a clip-bridge which is generally in U-shaped comprises two rearwardly extending side wires adapted for supporting on two ends of said primary bridge of said frame body and a downwardly curved clipping wire for extending behind said primary bridge, wherein said clip-bridge is arranged to securely clip on said primary bridge when said shelter frame is mounted in front of said primary spectacle frame.

30. The detachable shelter frame, as recited in claim 21, wherein said two resilient arms are affixed to lower portions of two outer sides of said two auxiliary lenses respectively while said two engaging members are arranged to protrude towards said auxiliary lenses respectively for locking with lower sides of two lens rims of said frame body of said primary spectacle frame.

31. The detachable shelter frame, as recited in claim 30, wherein said bridge is a clip-bridge which is generally in U-shaped comprises two rearwardly extending side wires adapted for supporting on two ends of said primary bridge of said frame body and a downwardly curved clipping wire for extending behind said primary bridge, wherein said clip-bridge is arranged to securely clip on said primary bridge when said shelter frame is mounted in front of said primary spectacle frame.

32. The detachable shelter frame, as recited in claim 21, further comprising two resilient mounting devices, wherein said four resilient arms of said four resilient mounting devices are affixed to upper and lower portions of said two outer sides of said two auxiliary lenses respectively, wherein said two engaging members of said two resilient arms affixed to said upper portions of said two auxiliary lenses are arranged to face downwards for locking with upper sides of two lens rims of said frame body of said primary spectacle frame, and that said two engaging members of said other two resilient arms affixed to said lower portions of said two auxiliary lenses are arranged to face upwards for locking with lower sides of said two lens rims of said frame body of said primary spectacle frame.

* * * * *